United States Patent
Lee et al.

(10) Patent No.: US 10,542,548 B2
(45) Date of Patent: Jan. 21, 2020

(54) METHOD FOR RECEIVING DEVICE-TO-DEVICE SIGNAL IN WIRELESS COMMUNICATION SYSTEM SUPPORTING CARRIER AGGREGATION, AND APPARATUS THEREFOR

(71) Applicant: LG Electronics Inc., Seoul (KR)

(72) Inventors: Seungmin Lee, Seoul (KR); Hanbyul Seo, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 15/303,135

(22) PCT Filed: Apr. 28, 2015

(86) PCT No.: PCT/KR2015/004228
§ 371 (c)(1),
(2) Date: Oct. 10, 2016

(87) PCT Pub. No.: WO2015/167207
PCT Pub. Date: Nov. 5, 2015

(65) Prior Publication Data
US 2017/0041918 A1 Feb. 9, 2017

Related U.S. Application Data

(60) Provisional application No. 61/986,084, filed on Apr. 29, 2014.

(51) Int. Cl.
*H04W 72/04* (2009.01)
*H04L 5/14* (2006.01)

(52) U.S. Cl.
CPC ............. *H04W 72/048* (2013.01); *H04L 5/14* (2013.01); *H04W 72/0413* (2013.01)

(58) Field of Classification Search
CPC ........... H04W 72/048; H04W 72/0413; H04W 72/042; H04W 72/044–72/0453; H04B 7/26; H04L 5/14
See application file for complete search history.

(56) References Cited

U.S. PATENT DOCUMENTS 10,051,657 B2 * 8/2018 Yasukawa ......... H04W 72/1289
2011/0255450 A1 * 10/2011 Wang ................ H04W 72/0493
370/280

(Continued)

FOREIGN PATENT DOCUMENTS

JP 2004-032390 A 1/2004
JP 2014-017764 A 1/2014

(Continued)

OTHER PUBLICATIONS

LG Electronics: "Multiplexing of Uu and D2D communication", R1-140335, 3GPP TSG RAN WG1 Meeting #76, Prague, Czech Republic, Feb. 10-14, 2014.

(Continued)

*Primary Examiner* — Khaled M Kassim
*Assistant Examiner* — Thomas R Cairns
(74) *Attorney, Agent, or Firm* — Dentons US LLP

(57) ABSTRACT

The present invention relates to a method for receiving a device-to-device signal of a terminal in a wireless communication system supporting frequency division duplex (FDD) band and time division duplex (TDD) band-based carrier aggregation. Particularly, the present invention comprises a step for receiving a D2D signal on an uplink cell of the FDD band according to whether a wide area network (WAN) signal of the TDD band is transmitted and received on a specific sub-frame in which the WAN signal is received on a downlink cell of the FDD band, wherein the D2D signal is received when the TDD band transmits the WAN signal (Continued)

and a reception circuit (RX chain) for the TDD band is reconfigured for the uplink cell of the FDD band.

8 Claims, 11 Drawing Sheets

(56) References Cited

U.S. PATENT DOCUMENTS

| | | | |
|---|---|---|---|
| 2013/0322413 A1 | 12/2013 | Pelletier et al. | |
| 2015/0092757 A1* | 4/2015 | Tiirola | H04L 5/0055 370/336 |
| 2016/0073407 A1* | 3/2016 | Nagata | H04W 76/10 370/280 |
| 2016/0143035 A1* | 5/2016 | Xue | H04L 5/001 370/329 |
| 2016/0218853 A1* | 7/2016 | Takeda | H04W 72/048 |

FOREIGN PATENT DOCUMENTS

| | | |
|---|---|---|
| WO | 2013/068788 A1 | 5/2013 |
| WO | 2014/061001 A1 | 4/2014 |

OTHER PUBLICATIONS

Samsung: "Half-duplex UE operation for TDD-FDD CA", 3GPP TSG RAN WG1 #76bis, R1-141283, Mar. 31-Apr. 4, 2014.

LG Electronics: "Issues on multiplexing of WAN and D2D", 3GPP TSG RAN WG1 Meeting #76bis, R1-141354, Mar. 31-Apr. 4, 2014.

ITRI: "Discussion on the Multiplexing of D2D and Cellular signals", 3GPP TSG RAN WG1 Meeting #76bis, R1-141478, Mar. 31-Apr. 4, 2014.

NEC: "Further Considerations on Multiplexing D2D and Cellular Signals", 3GPP TSG RAN WG1 Meeting #76bis, R1-141209, Mar. 31-Apr. 4, 2014.

* cited by examiner

FIG. 2
Prior Art
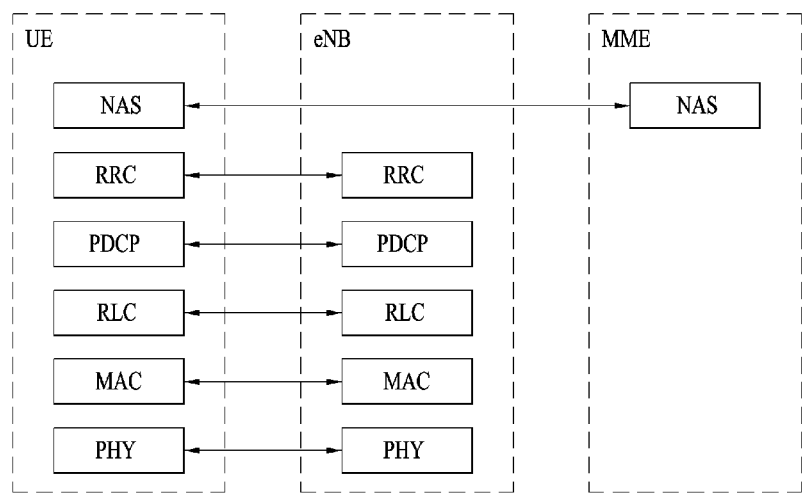
(a) control plane protocol stack
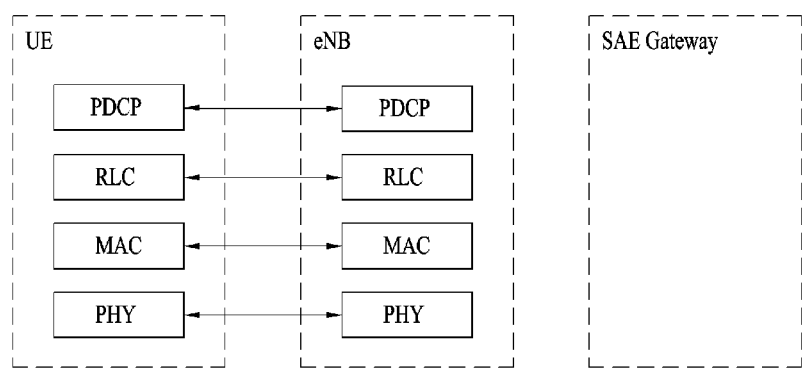
(b) user plane protocol stack

METHOD FOR RECEIVING DEVICE-TO-DEVICE SIGNAL IN WIRELESS COMMUNICATION SYSTEM SUPPORTING CARRIER AGGREGATION, AND APPARATUS THEREFOR

This application is a 35 USC § 371 National Stage entry of International Application No. PCT/KR2015/004228 filed on Apr. 28, 2015, and claims priority to U.S. Provisional Application No. 61/986,084 filed on Apr. 29, 2014, all of which are hereby incorporated by reference in their entireties as if fully set forth herein.

TECHNICAL FIELD

The present invention relates to a wireless communication system, and more particularly, to a method of receiving a D2D (device-to-device) signal in a wireless communication system supporting carrier aggregation and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE OF THE INVENTION

Technical Task

Based on the aforementioned discussion, the present invention intends to provide a method of receiving a D2D (device-to-device) signal in a wireless communication system supporting carrier aggregation and an apparatus therefor in the following.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a D2D (device-to-device) signal, which is received by a user equipment (UE) in a wireless communication system supporting carrier aggregation based on a FDD (frequency division duplex) band and a TDD (time division duplex) band, includes the step of receiving a D2D signal on an uplink cell of the FDD band according to whether or not a WAN signal of the TDD band is transmitted and received on a specific subframe in which a WAN (wide area network) signal is received on a downlink cell of the FDD band. In this case, the D2D signal is received when the TDD band transmits the WAN signal and a reception circuit (RX chain) for the TDD band is reconfigured for the uplink cell of the FDD band.

Preferably, if the TDD band receives the WAN signal and the reception circuit (Rx chain) for the TDD band is used to receive a downlink signal of the TDD band, the D2D signal may not be received.

Preferably, the UE can be configured to perform either a WAN signal reception operation or a D2D signal reception operation on the FDD band.

Preferably, the method can further include the step of signaling information on whether or not the reception circuit (Rx chain) for the TDD band is capable of being reconfigured to receive a D2D signal on the uplink cell of the FDD band.

Preferably, the method can further include the step of reporting information on at least one cell in which the reception circuit (Rx chain) for the TDD band is capable of being reconfigured to receive the D2D signal.

Preferably, the specific subframe may correspond to an uplink subframe on a downlink HARQ reference configuration for an eIMTA-TDD cell (enhanced interference management for traffic adaptation-enabled TDD cell).

Preferably, the TDD band includes a primary cell (Pcell) and a secondary cell (Scell) and the specific subframe may correspond to a subframe at the time of using both the primary cell and the secondary cell as an uplink subframe.

Preferably, the FDD band is configured by a FDD primary cell and the TDD band can be configured by a TDD secondary cell.

Preferably, the TDD band is configured by a TDD primary cell and the FDD band can be configured by a FDD secondary cell.

To further achieve these and other advantages and in accordance with the purpose of the present invention, according to a different embodiment, a user equipment receiving a D2D (device-to-device) signal in a wireless communication system supporting carrier aggregation based on a FDD (frequency division duplex) band and a TDD (time division duplex) band can include a radio frequency unit and a processor, the processor configured to receive a D2D signal on an uplink cell of the FDD band according to whether or not a WAN signal of the TDD band is transmitted and received on a specific subframe in which a WAN (wide area network) signal is received on a downlink cell of the FDD band. In this case, the D2D signal is received when the TDD band transmits the WAN signal and a reception circuit (RX chain) for the TDD band is reconfigured for the uplink cell of the FDD band.

Advantageous Effects

According to embodiments of the present invention, it is able to efficiently receive a D2D (device-to-device) signal in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

BEST MODE

Mode for Invention

Figure 1:
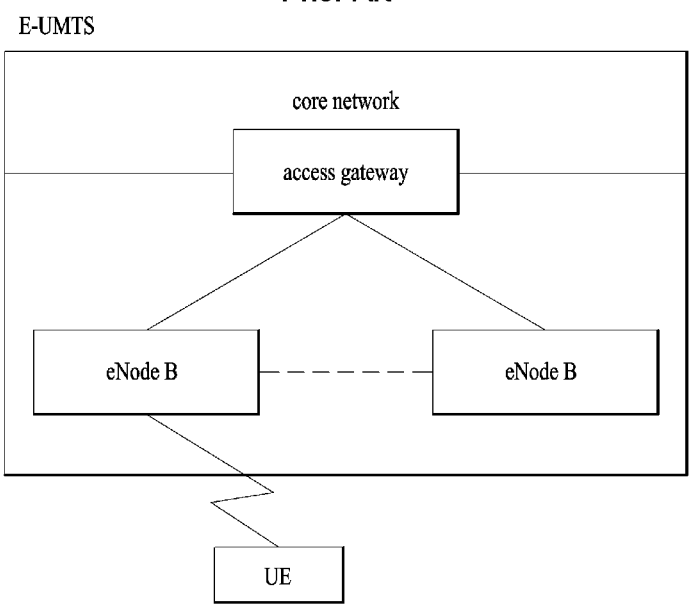
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
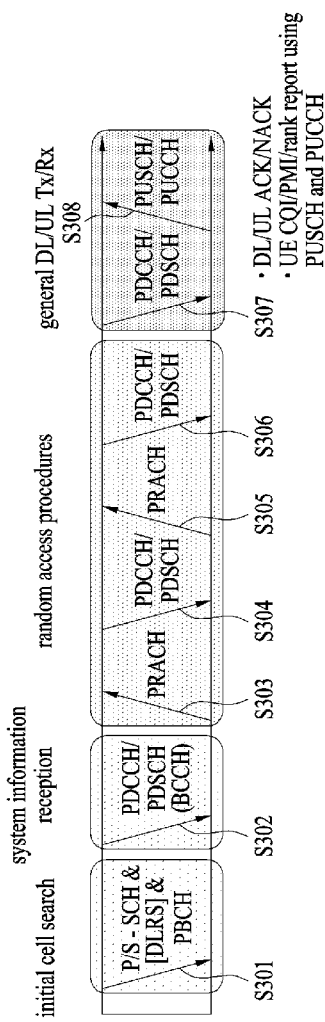
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. Control information transmitted from the user equipment to the base station will be commonly referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be simply referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may aperiodically transmit the UCI through the PUSCH in accordance with request/command of the network.

Figure 4:
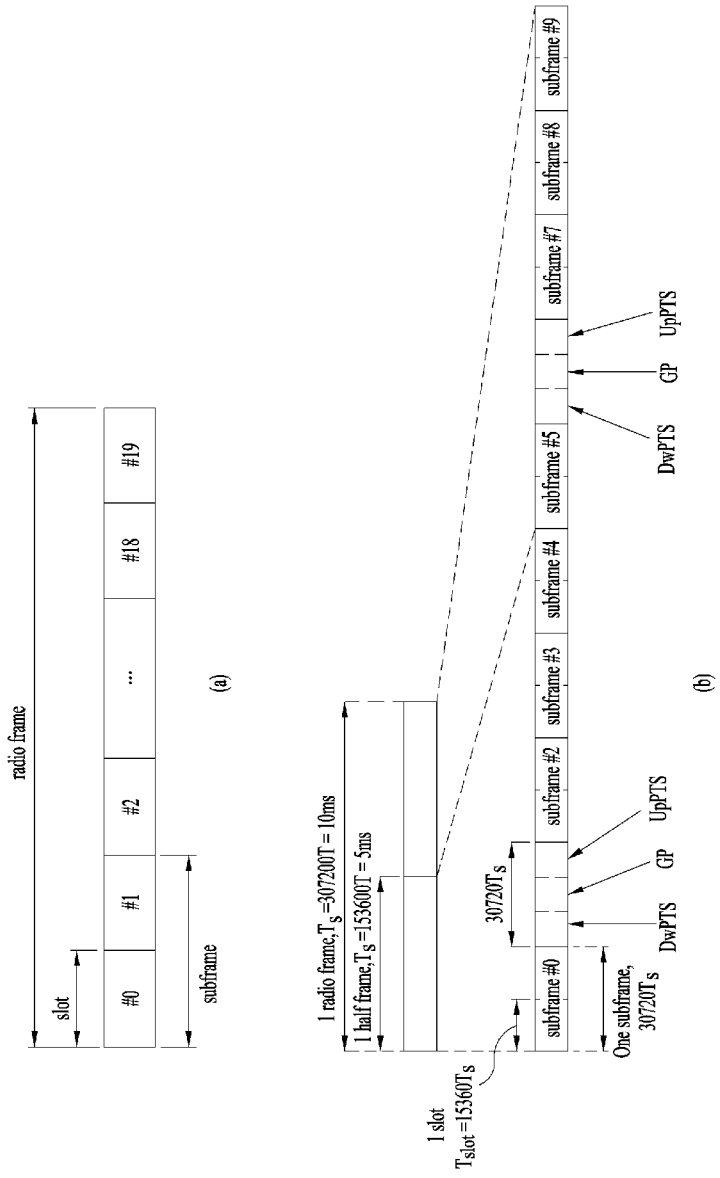
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| | | Normal cyclic prefix in downlink | | | Extended cyclic prefix in downlink | |
| | | | UpPTS | | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
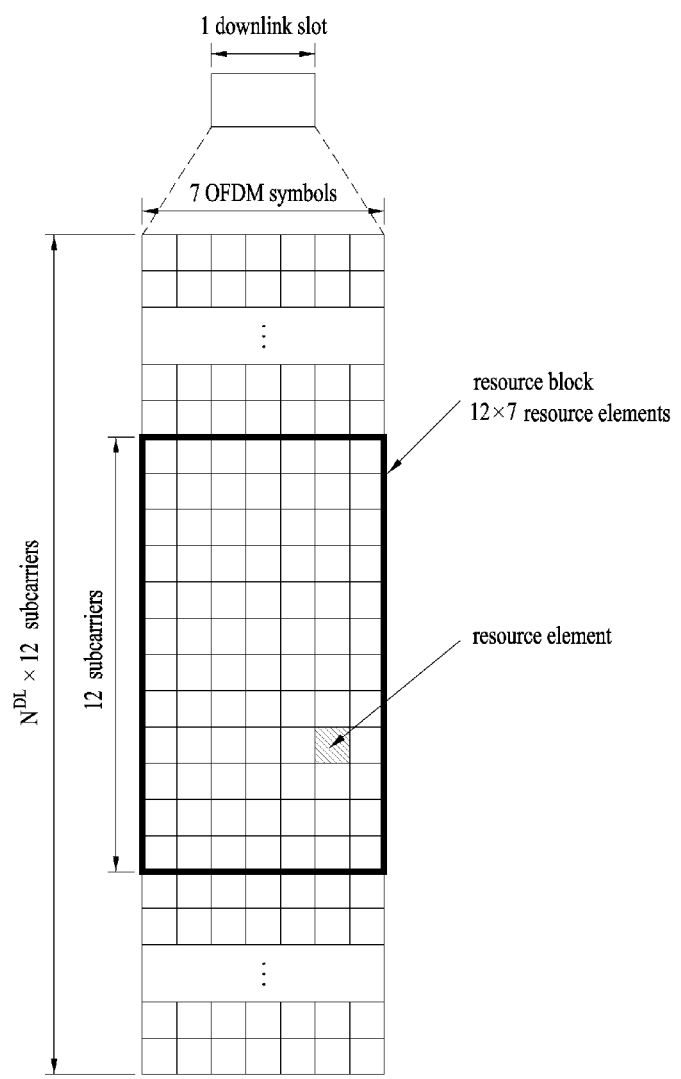
FIG. 5 is a diagram for an example of a resource grid for a downlink slot.

FIG. 5 is a diagram of a resource grid for a downlink slot.

Referring to FIG. 5, a DL slot includes $N_{symb}^{DL}$ OFDM symbols in time domain and $N_{RB}^{DL}$ resource blocks. Since each of the resource blocks includes $N_{sc}^{RB}$ subcarriers, the DL slot includes $N_{RB}^{DL} \times N_{sc}^{RB}$ subcarriers in frequency domain. FIG. 5 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called Resource Element (RE) and 1 single resource element is indicated by a single OFDM symbol index and a single subcarrier index. A single RB is configured with $N_{symb}^{DL} \times N_{sc}^{RB}$ resource elements. The number $N_{RB}^{DL}$ of resource blocks included in the DL slot is dependent on a DL transmission bandwidth configured in a cell.

Figure 6:
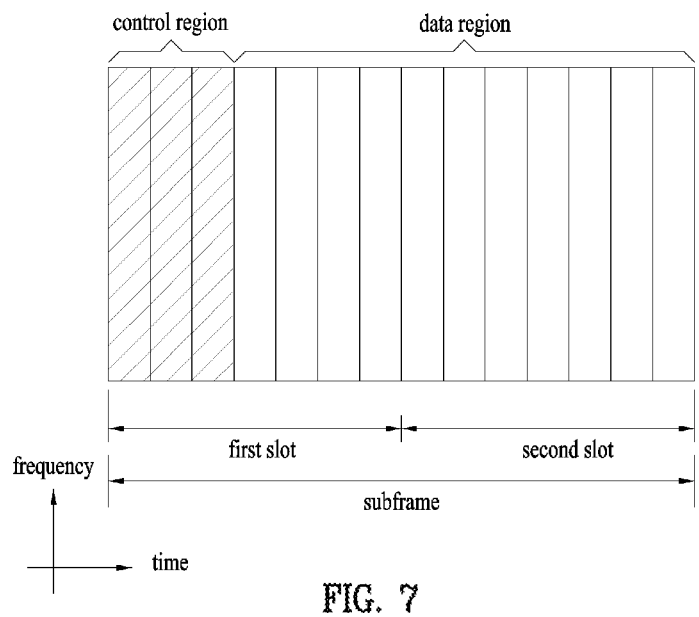
FIG. 6 is a diagram illustrating a structure of a downlink radio frame used in an LTE system.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
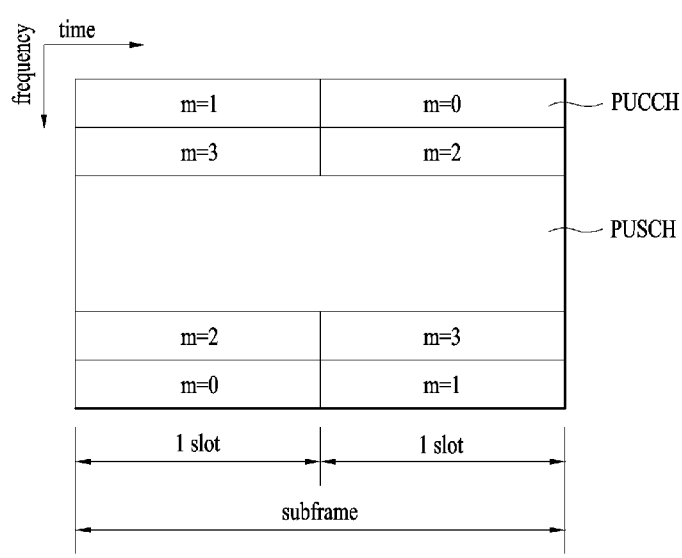
FIG. 7 is a diagram illustrating a structure of an uplink subframe used in an LTE system.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.
- SR (scheduling request): Information used for requesting uplink UL-SCH resource. OOK (on-off keying) scheme is used to transmit the SR.
- HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.
- CSI (channel state information): Feedback information on a DL channel CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

Figure 8:
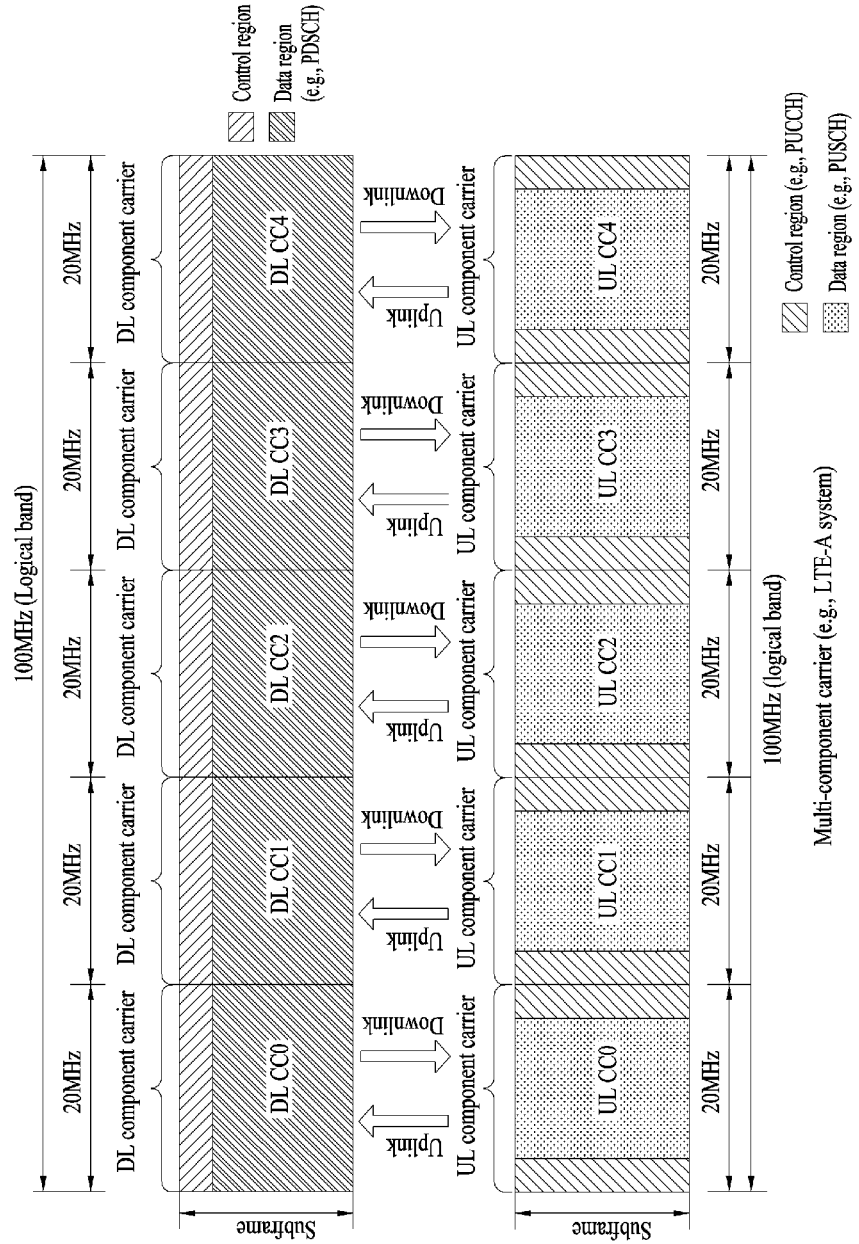
FIGS. 8 and 9 are diagrams for explaining carrier aggregation.

FIG. 8 is a diagram for an example of a carrier aggregation (CA) communication system.

Referring to FIG. 8, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As an example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, introduction of a CIF (carrier indicator field) can be considered. Whether a CIF exists or not within a PDCCH can be semi-statically and user-specifically (or user group-specifically) configured via an upper layer signaling (e.g., RRC signaling). A baseline of PDCCH transmission can be summarized as follows.

CIF disabled: PDCCH on DL CC allocates a PDSCH resource on the same DL CC or a PUSCH resource on a singly linked UL CC.

No CIF

Identical to LTE PDCCH structure (identical coding, identical CCE-based resource mapping) and DCI format CIF enabled: PDCCH on DL CC allocates a PDSCH or PUSCH resource on a specific DL/UL CC among a plurality of aggregated DL/UL CCs using a CIF.

Expanded LTE DCI format including a CIF

CIF (if configured) is a stationary x-bit field (e.g., x=3)

CIF (if configured) position is fixed irrespective of a DCI format size

Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 9:
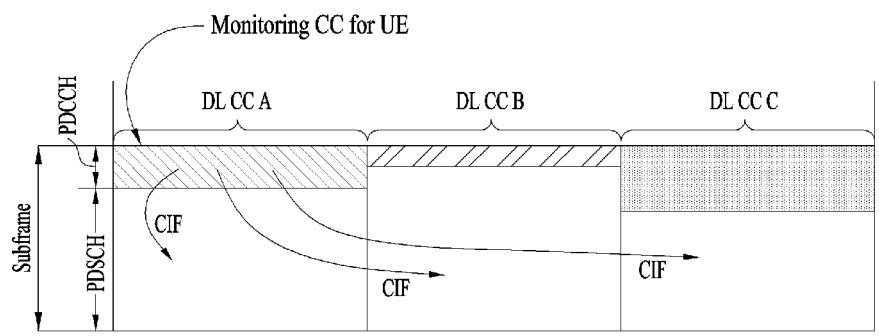

FIG. 9 is a diagram for an example of a scheduling in case that a plurality of carriers are aggregated with each other. Assume that 3 DL CCs are aggregated with each other and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE group-specific or cell-specific) upper layer signaling, the DL CC A (monitoring DL CC) may be able to transmit the PDCCH, which schedules the PDSCH of a different DL CC, as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

In the following, D2D (UE-to-UE communication) is explained.

A D2D communication scheme is mainly divided into a scheme of receiving help from a network/coordination station (e.g., a base station) and a scheme of not receiving a help from the network/coordination station.

Figure 10:
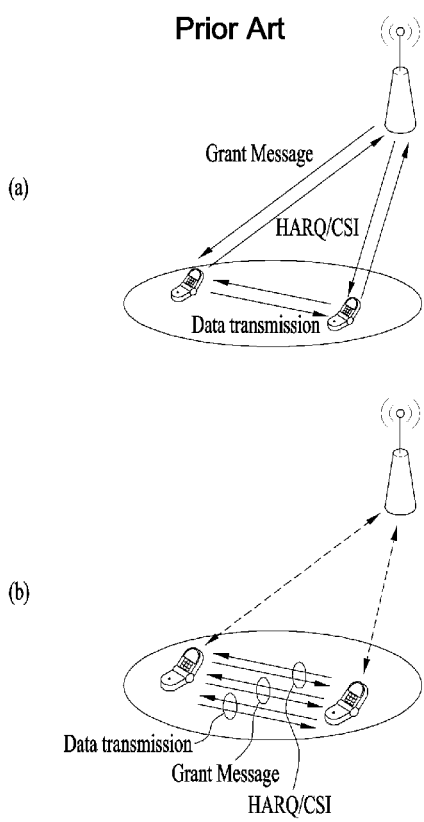
FIG. 10 is a diagram for explaining scenarios in which D2D communication is performed.

Referring to FIG. 10(a), a network/coordination station involves in transmitting and receiving a control signal (e.g., a grant message), HARQ, channel state information, etc. and data is transmitted and received only between terminals performing D2D communication. And, referring to FIG. 10(b), while a network provides minimum information (e.g., D2D connection information capable of being used in a cell) only, terminals performing D2D communication form a link to transmit and receive data.

Figure 11:
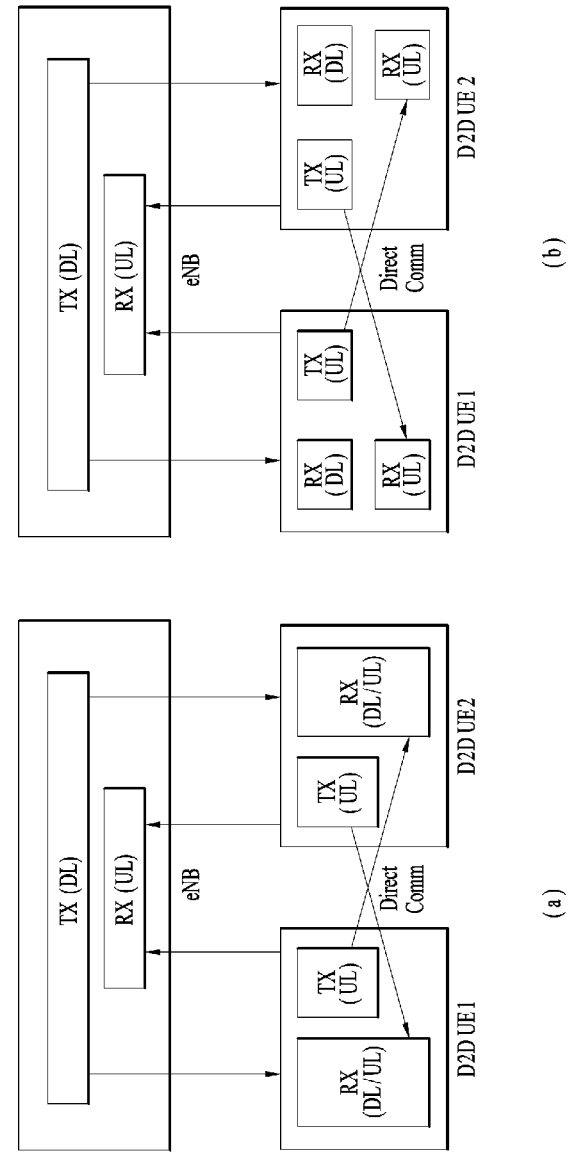
FIG. 11 is a diagram for explaining a reception circuit/module of a receiving end of a user equipment performing D2D communication.

FIG. 11 is a diagram for explaining a reception circuit/module of a receiving end of a user equipment performing D2D communication.

A first type corresponds to a half-duplex D2D receiver. Rx processing of D2D communication is performed by reusing a (modified) reception circuit/module used for downlink communication between a base station and a user equipment. For example, as shown in FIG. 11(a), if the half-duplex D2D receiver is applied, some subframes on an uplink band are configured for a usage of D2D communication (e.g., usage of transmitting/receiving a D2D discovery signal, usage of transmitting/receiving D2D data) in a FDD system. If it is necessary for a D2D UE to actually perform a D2D signal reception operation (e.g., D2D data reception operation, D2D discovery signal reception operation) in the subframes, the D2D UE is unable to receive a downlink signal from a base station in subframes on a downlink band at the time that at least a part (e.g., partial or fully) of the subframes is overlapped with each other.

A second type corresponds to a full-duplex D2D receiver. In this case, Rx processing of D2D communication is performed based on an independently implemented (e.g., a separated) reception circuit/module on an uplink band rather than a (general) reception circuit/module used for downlink communication between a base station and a user equipment. An example for a case of applying the full-duplex D2D receiver is explained with reference to FIG. 11(b) in the following. When some subframes on an uplink band are configured for a usage of D2D communication in a FDD system, if it is necessary for a D2D UE to actually perform a D2D signal reception operation (e.g., D2D data reception operation, D2D discovery signal reception operation) in the subframes, unlike the half-duplex D2D receiver case, the D2D UE is able to receive a downlink signal (e.g., PDCCH, PDSCH) from a base station in subframes on a downlink band although at least a part (e.g., partial or fully) of the subframes is overlapped with each other.

Based on the aforementioned contents, the present invention proposes a method of efficiently supporting D2D communication of a D2D UE when D2D (device-to-device) communication is performed by predetermined resources on a specific cell (or a component carrier (CC)) according to carrier aggregation in a situation that a carrier aggregation (CA) technique is applied. In this case, the D2D communication means that a UE directly performs communication with a different UE using a radio channel. In this case, although the UE corresponds to a terminal of a user, if such a network device as an eNB transmits and receives a signal according to a communication scheme between UEs, the network device can also be regarded as a sort of UEs.

In the following, for clarity, the present invention is explained based on a 3GPP LTE system. However, a range of systems to which the present invention is applied can be extended to other systems except the 3GPP LTE system.

Moreover, embodiments of the present invention can be extensively applied to at least one selected from the group consisting of i) a case that a part of D2D UEs participating in D2D communication is located at the inside of coverage of a network and the rest of D2D UEs is located at the outside of the coverage of the network (D2D discovery/communication of partial network coverage), ii) a case that all of the D2D UEs participating in D2D communication are located at the inside of the coverage of the network (D2D discovery/communication within network coverage), and iii) a case that all of the D2D UEs participating in D2D communication are located at the outside of the coverage of the network (D2D discovery/communication outside network coverage (for public safety only)).

And, as an embodiment of the present invention, if D2D communication is performed via predetermined resources on a carrier aggregation (CA)-related specific cell (or, a component carrier (CC)), a D2D UE can be configured to perform the D2D communication based on at least one (i.e., all or a part) of methods 1 to 4 disclosed in the present invention. In this case, for clarity, embodiments of the present invention assume a case that the D2D communication is performed by an uplink resource (on a specific cell) transmitted by a UE. And, for clarity, the embodiments of the present invention assume a case that two cells (e.g., a primary cell (Pcell) and a secondary cell (Scell)) are set to a D2D UE using a carrier aggregation technique. However, the embodiments of the present invention can be extensively applied to a case that D2D communication is performed by a different resource rather than an uplink resource (on a specific cell) and/or a case that three or more cells are set to a D2D UE using a carrier aggregation technique.

And, the embodiments of the present invention can be configured to be restrictively applied only when a D2D UE including a single RX chain (or RX circuit) for a specific cell uses/shares the RX chain for a specific cell-related WAN (wide area network) signal/data reception operation (i.e., WAN communication reception operation) and a D2D signal/data reception operation (i.e., D2D communication reception operation) only. In other word, since it is necessary for the D2D UE to perform the specific cell-related WAN communication reception operation (i.e., band #A) and the D2D communication reception operation (i.e., band #B) using a single RX chain, the D2D UE can perform one of the specific cell-related WAN communication reception operation and the D2D communication reception operation only at specific timing. Specifically, the D2D UE is unable to perform a WAN signal/data reception operation on a DL CC (i.e., band #A) and a D2D signal/data reception operation on an UL CC (i.e., band #B) at the same time at specific timing (SF #N) of a FDD cell (the FDD cell consists of a DL CC and a UL CC) and the D2D UE is able to perform one of the two operations only. In this case, assume that the WAN communication reception operation-related DL CC and the D2D communication reception operation-related UL CC in the FDD cell correspond to frequency bands of a different position.

And, a specific rule of the embodiments of the present invention can be interpreted or applied as an Rx chain (or Rx circuit) of a band (e.g., a band or a cell) is temporarily used by a D2D communication reception operation of another band (e.g., a band or a cell). For example, a rule 1-B of a first method or a rule 2-B of a second method of the present invention can be applied to a case of temporarily using an Rx chain (or an Rx circuit) of a specific band in a manner of switching the Rx chain with a D2D communication reception operation of a different band.

Method 1

A method 1 capable of being applied to a case that a FDD Pcell (in this case, the FDD Pcell consists of a DL CC and a UL CC) and a TDD Scell are configured by a carrier aggregation (CA) technique and D2D communication is performed via predetermined resources on the UL CC of the FDD Pcell is explained in the following.

CASE #1-A: assume that i) a D2D communication reception operation on the UL CC of the FDD Pcell, a WAN communication reception operation on the DL CC of the FDD Pcell, and a WAN communication reception operation of the TDD Scell are overlapped with each other at a specific subframe timing (i.e., SF #N), or ii) a subframe of a corresponding timing is configured for a usage of D2D communication (reception) on the UL CC of the FDD Pcell, a subframe of a corresponding timing is configured as a WAN communication-related downlink subframe on the DL CC of the FDD Pcell, and a subframe of a corresponding timing is configured as a WAN communication-related downlink subframe of the TDD Scell at a specific subframe timing (i.e., SF #N).

In this case, a D2D UE uses an RX chain related to the FDD Pcell for i) the WAN communication reception operation on the DL CC of the FDD Pcell (i.e., the D2D UE does not perform D2D communication reception operation on the UL CC of the FDD Pcell) or ii) the D2D communication reception operation on the UL CC of the FDD Pcell according to a predetermined rule or a related signal received from a base station. The D2D UE may use an Rx chain related to the TDD Scell for the WAN communication reception operation on the TDD Scell (rule 1-A).

CASE #1-B: assume that i) a D2D communication reception operation on the UL CC of the FDD Pcell, a WAN communication reception operation on the DL CC of the FDD Pcell, and a WAN communication transmission operation (i.e., WAN signal/data transmission operation) of the TDD Scell are overlapped with each other at a specific subframe timing (i.e., SF #N), or ii) a subframe of a corresponding timing is configured for a usage of D2D communication (reception) on the UL CC of the FDD Pcell, a subframe of a corresponding timing is configured as a WAN communication-related downlink subframe on the DL CC of the FDD Pcell, and a subframe of a corresponding timing is configured as a WAN communication-related uplink subframe of the TDD Scell at a specific subframe timing (i.e., SF #N).

In this case, a D2D UE uses an RX chain related to the FDD Pcell for the WAN communication reception operation on the DL CC of the FDD Pcell and the D2D communication reception operation on the UL CC of the FDD Pcell according to a predetermined rule or a related signal received from a base station. The D2D UE may (re)use (or borrow) an Rx chain related to the TDD Scell for the D2D communication reception operation on the UL CC of the FDD Scell. Or, the D2D UE may use an RX chain related to the FDD Pcell for the D2D communication reception operation on the UL CC of the FDD Pcell according to a predetermined rule or a related signal received from a base station. The D2D UE may (re)use (or borrow) an Rx chain related to the TDD Scell for the WAN communication reception operation on the DL CC of the FDD Scell (rule 1-B).

Method 2

A method 2 capable of being applied to a case that a FDD Pcell (in this case, the FDD cell consists of a DL CC and a UL CC) and a TDD Scell are configured by a carrier aggregation (CA) technique and D2D communication is performed via predetermined resources on the UL CC of the FDD Pcell is explained in the following.

CASE #2-A: assume that i) a D2D communication reception operation on the UL CC of the FDD Scell, a WAN communication reception operation on the DL CC of the FDD Scell, and a WAN communication reception operation of the TDD Pcell are overlapped with each other at a specific subframe timing (i.e., SF #N), or ii) a subframe of a corresponding timing is configured for a usage of D2D communication (reception) on the UL CC of the FDD Scell, a subframe of a corresponding timing is configured as a WAN communication-related downlink subframe on the DL CC of the FDD Scell, and a subframe of a corresponding timing is configured as a WAN communication-related downlink subframe of the TDD Pcell at a specific subframe timing (i.e., SF #N).

In this case, a D2D UE uses an RX chain related to the FDD Scell for i) the WAN communication reception operation on the DL CC of the FDD Scell (i.e., the D2D UE does not perform D2D communication reception operation on the UL CC of the FDD Scell) or ii) the D2D communication reception operation on the UL CC of the FDD Scell according to a predetermined rule or a related signal received from a base station. The D2D UE may use an Rx chain related to the TDD Pcell for the WAN communication reception operation on the TDD Pcell (rule 2-A).

CASE #2-B: assume that i) a D2D communication reception operation on the UL CC of the FDD Scell, a WAN communication reception operation on the DL CC of the FDD Scell, and a WAN communication transmission operation (i.e., WAN signal/data transmission operation) of the TDD Pcell are overlapped with each other at a specific subframe timing (i.e., SF #N), or ii) a subframe of a corresponding timing is configured for a usage of D2D communication (reception) on the UL CC of the FDD Scell, a subframe of a corresponding timing is configured as a WAN communication-related downlink subframe on the DL CC of the FDD Scell, and a subframe of a corresponding timing is configured as a WAN communication-related uplink subframe of the TDD Pcell at a specific subframe timing (i.e., SF #N).

In this case, a D2D UE uses an RX chain related to the FDD Scell for the WAN communication reception operation on the DL CC of the FDD Scell according to a predetermined rule or a related signal received from a base station. The D2D UE may (re)use (or borrow) an Rx chain related to the TDD Pcell for the D2D communication reception operation on the UL CC of the FDD Scell. Or, the D2D UE may use an RX chain related to the FDD Scell for the D2D communication reception operation on the UL CC of the FDD Scell according to a predetermined rule or a related signal received from a base station. The D2D UE may (re)use (or borrow) an Rx chain related to the TDD Pcell for the WAN communication reception operation on the DL CC of the FDD Scell (rule 2-B).

Method 3

According to the aforementioned methods 1 to 2, when a D2D UE (re)uses (or borrows) an Rx chain related to a specific cell for a D2D communication reception operation/ WAN communication reception operation related to a different cell (e.g., rule 1-B or rule 2-B), it is determined according to whether or not the Rx chain related to the specific cell supports a reception operation on a band related to the different cell.

Hence, the D2D UE can be configured to report i) information on whether or not an Rx chain related to a specific cell supports a reception operation on a band, or ii) information on a reception operation, which is supported by the Rx chain related to the specific cell, of a cell among a plurality of cells configured by a carrier aggregation technique to a base station (or a serving cell) via a predetermined signal (e.g., a physical layer signal or a higher layer signal). In this case, the above-mentioned information reporting operation can be comprehended as "capability signaling (e.g., whether or not an Rx chain of a band is usable by being temporarily switched to a D2D communication reception operation of a different band)".

If an Rx chain of a band is usable in a manner of being temporarily switched to a D2D reception operation of a different band, a list of bands capable of being switched and used by the Rx chain can be included in the information reporting. For example, if a UE is configured to perform WAN DL reception in a combination of specific bands, the UE can report bands capable of being switched for D2D reception operation received by the remained Rx chains.

Specifically, if a UE is configured to perform WAN DL reception on bands A and B, the UE can report that Rx chains of the UE are able to be switched for D2D reception on the band A, a band C and a band D. The reporting can be comprehended as the UE is able to perform the WAN DL reception on the band A and the band B all the time and the UE is able to perform D2D reception on one band selected from the group consisting of the band A, the band C and the band D. However, it does not mean that D2D reception is available on two or more bands at the same time.

In order to report that D2D reception is available on two or more bands at the same time, it may be able to report a combination of bands capable of being switched for the D2D reception. Specifically, if WAN DL reception is configured on a band A and a band B, a UE may report that Rx chains of the UE are capable of being switched to a D2D reception operation in a combination of bands {A, C} and {A, D}. The above-mentioned report may indicate that the UE is able to perform WAN DL reception on the band A and the band B all the time, the UE is able to receive a D2D signal on the band A and the band C at the same time, or the UE is able to receive a D2D signal on the band A and the band D at the same time.

Moreover, a specific band (e.g., the band A in the aforementioned example) can be included in a combination of bands capable of performing WAN DL reception and a band capable of performing D2D reception at the same time. In this case, if the specific band operates TDD, it may indicate that D2D reception is available on the specific band only when a TDD cell of the specific band configures a UL subframe. And, as an example, a target Rx chain of the aforementioned information reporting can be restricted to an Rx chain of a specific system (e.g., TDD or FDD system)-related cell.

Moreover, as a further different embodiment of the present invention, candidate resources capable of being designated for a usage of D2D communication on a specific cell (or CC) can be restricted to resources described in methods 4 to 5 in the following.

Method 4

In a TDD cell (eIMTA (enhanced interference management for traffic adaptation)-enabled TDD cell)) to which a dynamic change mode of a radio resource usage is set, uplink subframes (i.e., uplink subframes used for a fixed usage (or a semi-static usage)) on a downlink HARQ reference configuration related to the eIMTA-enabled TDD cell can be defined as candidate resources capable of being designated for a usage of D2D communication only.

Method 5

In general, when cells (e.g., TDD Pcell, TDD Scell) including UL-DL configurations different from each other are configured by a carrier aggregation technique and a UE is unable to simultaneously perform transmission and reception operations on the cells, the UE is defined to perform transmission/reception operation according to restrictions shown in Table 3 in the following (refer to 3GPP TS 36.211 Section 4.2 "Frame structure type 2").

TABLE 3

In case multiple cells with different uplink-downlink configurations are aggregated and the UE is not capable of simultaneous reception and transmission in the aggregated cells, the following constraints apply [1]:
If the subframe in the primary cell is a downlink subframe, the UE shall not transmit any signal or channel on a secondary cell in the same subframe
If the subframe in the primary cell is an uplink subframe, the UE is not expected to receive any downlink transmissions on a secondary cell in the same subframe
If the subframe in the primary cell is a special subframe and the same subframe in a secondary cell is a downlink subframe, the UE is not expected to receive PDSCH/EPDCCH/PMCH/PRS transmissions in the secondary cell in the same subframe, and the UE is not expected to receive any other signals on the secondary cell in OFDM symbols that overlaps with the guard period or UpPTS in the primary cell.

Hence, for a UE incapable of performing simultaneous transmission and reception operation, UL subframes on Scell capable of being used as UL subframe in both Pcell and Scell can be defined as candidate resources capable of being designated for a usage of D2D communication only according to Table 3.

In addition, if an uplink subframe on the Scell is designated as a subframe used for a usage of D2D communication at the timing that the Pcell is used as a downlink subframe and the Scell is used as an uplink subframe, it may be able to configure a UE (e.g., a HD UE) incapable of performing simultaneous transmission and reception operation to consider the uplink subframe on the Scell of the timing as a subframe in which a D2D reception operation (i.e., D2D signal/data reception operation) is permitted only.

Moreover, since the embodiments of the present invention correspond to one of implementation methods of the present invention, it is apparent that the embodiments of the present invention are considered as a sort of proposed schemes. Although the aforementioned proposed schemes can be independently implemented, and the aforementioned proposed schemes can also be implemented in a combination form of a part of the proposed schemes.

And, the embodiments of the present invention can be configured to be restrictively applied to D2D communication (and/or D2D discovery) only.

And, the embodiments of the present invention can be configured to be restrictively applied to D2D communication of a specific mode (e.g., MODE1, MODE2) (and/or D2D discovery of a specific type (e.g., TYPE1, TYPE2B)) only.

And, the embodiments of the present invention can be configured to be restrictively applied to at least one selected from the group consisting of i) IN-COVERAGE D2D UE, ii) PARTIAL COVERAGE D2D UE, iii) OUT-COVERAGE D2D UE, iv) IN-COVERAGE SCENARIO, v) PARTIAL COVERAGE SCENARIO, and vi) OUT-COVERAGE SCENARIO.

And, the embodiments of the present invention can be configured to be restrictively applied to an RRC_CONNECTED D2D UE or an RRC_IDLE D2D UE.

Figure 12:
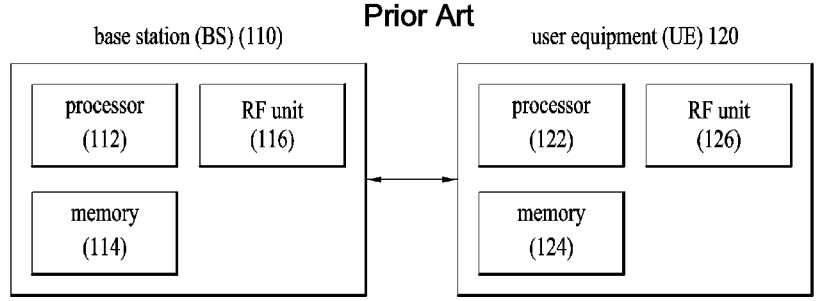
FIG. 12 is a diagram for a base station and a user equipment applicable to one embodiment of the present invention.

FIG. 12 is a diagram for a base station and a user equipment applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 12, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Figure 13:
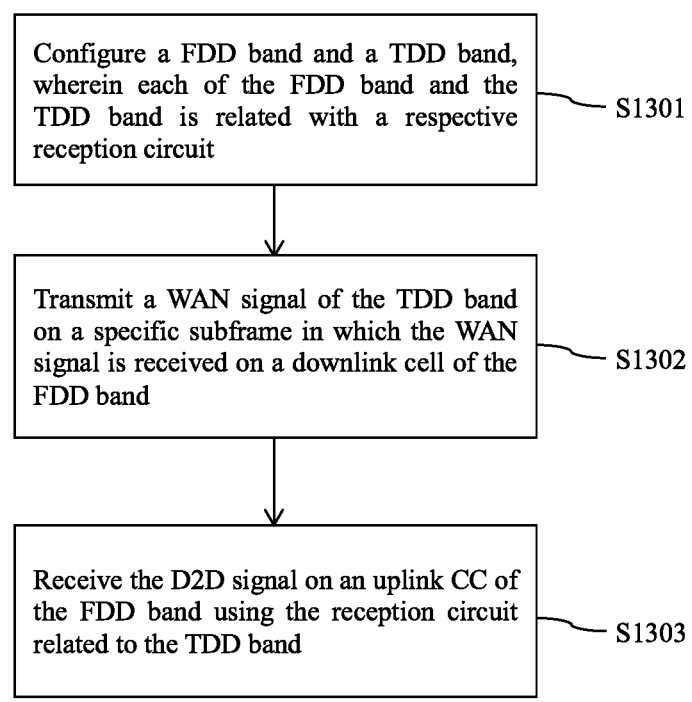
FIG. 13 is a diagram explaining an example of a method of receiving a D2D signal by a UE in a wireless communication system in accordance with one embodiment of the present invention.

FIG. 13 is a diagram explaining an example of a method of receiving a D2D signal by a UE in a wireless communication system in accordance with one embodiment of the present invention. Referring to FIG. 13, the method comprises steps of configuring a FDD band and a TDD band, wherein each of the FDD band and the TDD band is related with a respective reception circuit (S1301), transmitting a WAN signal of the TDD band on a specific subframe in which the WAN signal is received on a downlink cell of the FDD band (S1302), and receiving the D2D signal on an uplink CC of the FDD band using the reception circuit related to the TDD band (S1303). The method is configured to carry out various steps exemplified in the specifications and drawings.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the method of receiving a D2D (device-to-device) signal in a wireless communication system supporting carrier aggregation and an apparatus therefor are described centering on examples applied to 3GPP LTE system, it may be applicable to various wireless communication systems as well as to the 3GPP LTE system.

What is claimed is:

1. A method of receiving a device-to-device (D2D) signal, by a user equipment (UE) in a wireless communication system, the method comprising:
configuring a frequency division duplex (FDD) band and a time division duplex (TDD) band, wherein each of the FDD band and the TDD band is related to a respective reception circuit, and
receiving the D2D signal on and uplink component carrier (CC) of the FDD band based on whether a wide area network (WAN) signal of the TDD band is transmitted or received on a specific subframe in which a WAN signal is received on a downlink CC of the FDD band, wherein when the WAN signal of the TDD band is transmitted on the specific subframe, the D2D signal is received on the uplink CC of the FDD band using the reception circuit related to the TDD band.

2. The method of claim 1, further comprising:
transmitting information on whether the reception circuit related to the TDD band can be used to receive the D2D signal on the specific subframe of the uplink CC of the FDD band.

3. The method of claim 1, further comprising:
reporting information on at least one CC in which the reception circuit for the TDD band can be used to receive the D2D signal.

4. The method of claim 1, wherein the subframe corresponds to an uplink subframe on a downlink HARQ reference configuration for an enhanced interference management for traffic adaption-enabled TDD CC (eIMTA-TDD CC).

5. The method of claim 1, wherein the TDD band comprises a primary CC (PCC) and a secondary CC (SCC), and wherein the specific subframe corresponds to a subframe when using both the primary CC and the secondary CC as an uplink subframe.

6. The method of claim 1, wherein the FDD band is configured by an FDD primary CC (FDD PCC), and wherein the TDD band is configured by a TDD secondary CC (FDD SCC).

7. The method of claim 1, wherein the TDD band is set to a TDD primary CC (TDD PCC) and wherein the FDD band is set to an FDD secondary CC (TDD SCC).

8. A user equipment (UE) receiving a D2D (device-to-device) signal in a wireless communication system, the UE comprising:
a transmitter and a receiver; and
a processor, operatively coupled to the transmitter and the receiver, wherein the processor is configured to:
configure a frequency division duplex (FDD) band and a time division duplex (TDD) band, wherein each of the FDD band and the TDD band is related to a respective reception circuit, and
receive the D2D signal on an uplink component carrier (CC) of the FDD band based on whether a wide area network (WAN) signal of the TDD band is transmitted or received on a specific subframe in which the WAN signal is received on a downlink CC of the FDD band, wherein when the WAN signal of the TDD band is transmitted on the specific subframe, the D2D signal is received on uplink CC of the FDD band using reception circuit related to the TDD band.

* * * * *